United States Patent

[11] 3,550,650

[72] Inventor Hachiro Yamashita
No. 1032-2 1 chome Ohwada machi, Omiya, Japan
[21] Appl. No. 606,741
[22] Filed Jan. 3, 1967
[45] Patented Dec. 29, 1970

[54] APPARATUS FOR PACKING FLOWABLE MATERIALS
2 Claims, 6 Drawing Figs.
[52] U.S. Cl. .................................................. 141/145,
177/54; 222/77, 222/410
[51] Int. Cl. ...................................................... B65b 43/60
[50] Field of Search ............................................ 141/131-
—133, 144, 145, 153, 166, 167, 196, 83;
177/54—56, 85, 110; 222/55, 77, 162, 410

[56] References Cited
UNITED STATES PATENTS
1,560,800  11/1925  Hoberecht .................... 222/410X
2,675,203  4/1954  Birkland ....................... 177/55
FOREIGN PATENTS
509,793  8/1920  France ......................... 141/145
460,800  11/1949  Canada ........................ 177/54

Primary Examiner—Fred C. Mattern, Jr.
Assistant Examiner—Edward J. Earls
Attorney—Steinberg and Blake ABSTRACT: An apparatus for packing flowable materials utilizing both weighing of the material and dividing of the material into equal quantities. Where these quantities are relatively small and light, the weighing takes place before the dividing of the material into the equal quantities, whereas when the quantities are relatively large and heavy the weighing takes place after the dividing of the material into the quantities. The material is delivered in the form of a body to a predetermined central location from which the material is circumferentially spread out into a layer so as to avoid any agglomerations and so as to promote the uniformity of the division of the material into the quantities which are eventually packed in suitable containers. The quantities of material can be simultaneously introduced into a plurality of containers or they can be successively delivered to a location at which they are successively introduced into containers which may thereafter be heat sealed, for example. The flowable material can be liquid or solid, and in the case of a solid, particulate material the centrifugal spreading means not only prevents agglomerations but also promotes a very uniform distribution between the particles of the material, and it is possible to successively handle in an advantageous manner different materials of different properties without requiring any special accessories.

INVENTOR.
HACHIRO YAMASHITA
BY Steinberg + Blake
ATTORNEYS

PATENTED DEC 29 1970
3,550,650
SHEET 2 OF 3
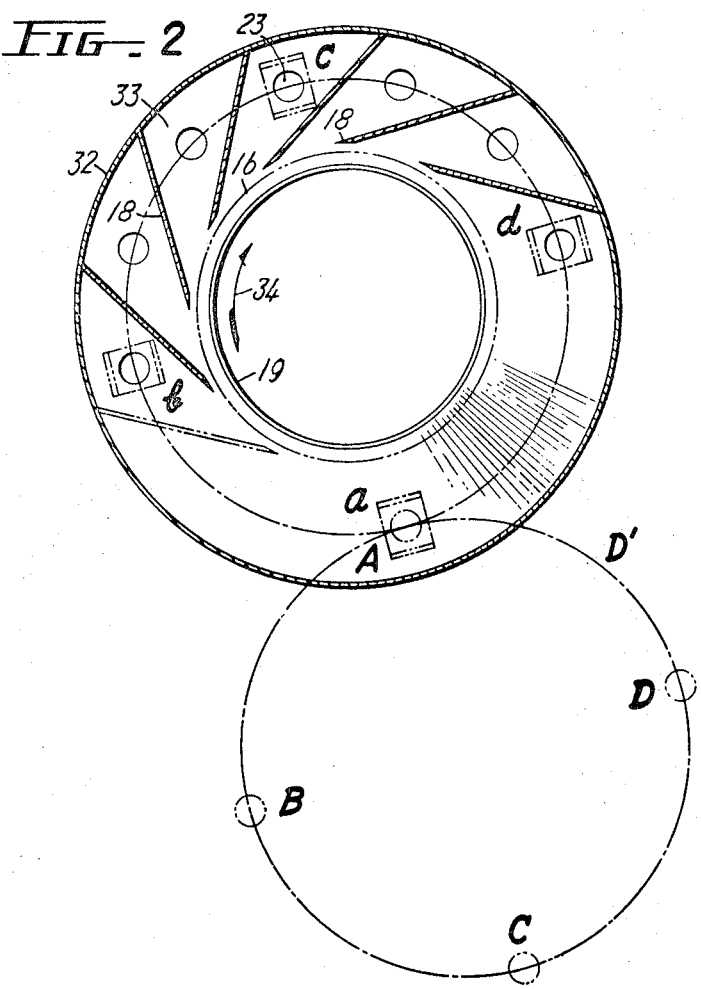
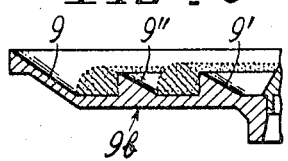
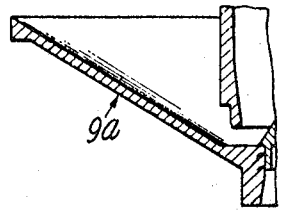
INVENTOR.
HACHIRO YAMASHITA
BY Steinberg & Blake
ATTORNEYS

INVENTOR.
HACHIRO YAMASHITA

APPARATUS FOR PACKING FLOWABLE MATERIALS

The invention relates to the packing of flowable materials.

Thus, the present invention relates to the packing of flowable materials which may be in solid, particulate form, having a powdery, granular, or relatively coarse form, or the material may be in liquid form.

In general there are two systems for packing flowable materials, one operating according to volume and the other operating according to weight. The system of packing flowable materials according to weight is in general preferred and is more widely used because of its greater accuracy as compared with volumetric systems where apparently equal quantities may not actually be equal, so that there are unavoidable inaccuracies in the volumetric system.

When using the weight system for determining the packed quantities of a flowable material, it is almost impossible to estimate accurately the weight of a given quantity, and therefore it is essential for the operator to approximately provide about 90 percent of the total weight after which the additional 10 percent is carried out with a suitable weighing scale. The result is not only a considerable amount of tedious expensive operations, but even with such operations there are inherent inaccuracies which cannot be avoided, so that this system has the disadvantage of being both inefficient and inaccurate.

Many attempts have been made to improve the packing of flowable materials. For example, it is known to attempt to regulate the speed of flow of the flowable material while weighing the latter accurately, so as to attempt to provide a more efficient packing which will be more accurate. However, at the present time large errors are still encountered, and the extent to which mass-production methods can be used in packing many materials is very limited. This latter disadvantage particularly applies in the case of medicines, dressing materials, and other types of additives which are required to be packed in small quantities ranging, for example, from 5 grams to 10 grams. When dealing with such small quantities there are unavoidable substantial inaccuracies.

It is accordingly a primary object of the present invention to provide an apparatus which will avoid the above drawbacks.

In particular, it is an object of the present invention to provide an apparatus capable of very accurately packing flowable materials in predetermined quantities into suitable containers.

In particular, it is an object of the invention to provide an apparatus which can be used not only for relatively small, light quantities but also for relatively large heavy quantities, with equal accuracy in both cases.

Yet another object of the present invention is to provide for an apparatus of the above type a system according to which the material, when in the form of a particulate solid, will be spread out in such a way that agglomerations of the material cannot occur and the particles thereof are very uniformly distributed with respect to each other.

Also, the objects of the present invention include an apparatus capable of very rapidly filling a large number of containers with relatively low cost required by the apparatus of the invention.

Also, it is an object of the invention to provide an apparatus capable of handling not only particulate solids but also liquids, particularly highly viscous liquids such as fats and oils.

Furthermore, it is an object of the present invention to provide an apparatus which will guarantee not only that each package has a given weight of material but also that each package has a given quantity or bulk of the material.

Furthermore, the objects of the present invention include an apparatus capable of successively handling different materials of widely different properties, without requiring any special adjustments or accessories for this purpose.

The objects of the present invention also include the provision of an apparatus which requires only a small amount of power for its operation.

In particular, in this latter connection, it is an object of the invention to provide an apparatus which will take advantage of forces of inertia to provide high speed rotation, for example, while utilizing only a small amount of power.

In addition it is an object of the present invention to provide an apparatus capable of being widely used in many different types of industries for many different purposes such as blending, checking, manufacturing processes of different types, and for packages of all types whether they be boxes, cans heat sealable enclosures, etc.

The apparatus of the invention includes a supply means which supplies the flowable material to a predetermined central location where a centrifugal-spreading means is located for spreading the material from the central location out into the form of a layer, the centrifugal-spreading means moving the layer of material across a circle which is coaxially positioned with respect to the central location to which the material is delivered by the supply means. Surrounding and located closely adjacent to this circle are a plurality of compartment means having openings communicating with the circle for receiving the material therefrom, this plurality of compartment means acting to receive equal quantities of material which has been centrifugally spread out, and a plurality of compartment means respectively terminate in bottom outlet ends through which the several quantities of the material discharge. A plurality of receptacle means are respectively situated beneath the bottom outlet ends of the plurality of compartment means to receive the quantities of material therefrom. All of the above means define for the material a path of movement starting from the supply means and extending therefrom to the central location, the path of movement then spreading out circumferentially to the above-mentioned circle from where the path of movement includes a plurality of subsidiary paths of movement respectively extending downwardly through the plurality of compartment means to the plurality of receptacle means. The weighing means of the invention is situated at this path of movement for temporarily interrupting the flow of at least part of the material while weighing the latter until a predetermined weight thereof is reached, whereupon the weighing means releases the material weighed thereby for continued movement along the path of movement.

The invention is illustrated by way of example in the accompanying drawings which form part of this application and in which:

FIG. 2 is a sectional plan view taken along line II–II of FIG. 1 in the direction of the arrows, FIG. 2 additionally showing schematically how the quantities are packed;

FIG. 3 is a fragmentary sectional elevation of another embodiment of a centrifugal spreading means of the invention;

FIG. 4 is a fragmentary sectional elevation of a further embodiment of a centrifugal spreading means of the invention;

Figure 1:
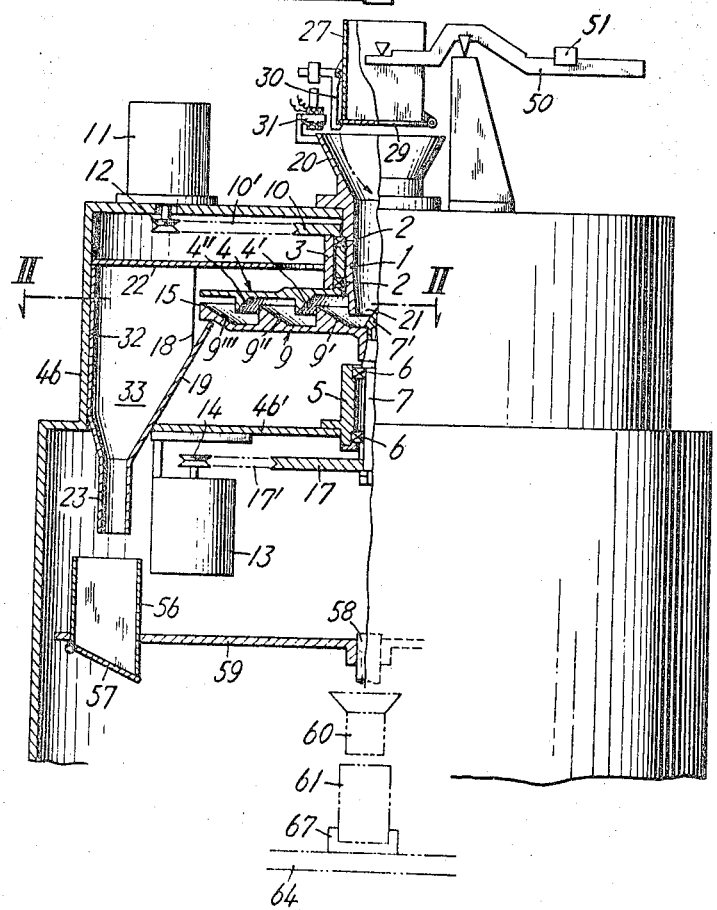
FIG. 1 is a partly sectional and partly schematic side elevation of one possible embodiment of an apparatus according to the invention for carrying out the method of the invention.

Referring now to FIG. 1, the machine illustrated therein has an outer stationary body 46 which carries the other structure of the machine. The stationary machine body 46 has a horizontal top wall which fixedly carries a vertical guide sleeve 1 through which the flowable material is introduced into the machine from a supply means. This sleeve 1 is upwardly flared at its upper end 20 which situated above the top wall of the frame 46 of the machine, and the bottom end of the sleeve 1 is open.

A pair of coaxial bearings 2 are fixedly carried by and surround the sleeve 1 at the exterior thereof and in the interior of the body 46 below the top wall of the latter, and these bearings 2 are spaced from each other by a suitable spacer ring which also surrounds and is fixed to the exterior surface of the sleeve 1. The outer races of the bearings 2 are fixed to the inner surface of a rotary cylinder 3 which at its top end is fixed to a pulley 10 and at its bottom end is fixed to a disc 4.

The top wall of the body 46 carries a driving motor 11, the drive shaft of which extends through a suitable opening of this top wall into the interior of the body 46 where the drive shaft fixedly carries a pulley 12 situated in the same plane as the pulley 10. A belt 10' extends around and frictionally engages the pulleys 10 and 12 so as to transmit the drive from the motor 11 to the pulley 10, and in this way the cylinder 3 is rotated so as to transmit the rotation to the rotary disc 4. The rotary disc 4 which is thus carried by and rotates with the cylinder 3 is formed with a central opening through which the lower end portion of the sleeve 1 extends with clearance. The disc 4 is situated in a substantially horizontal plane which is normal to the vertical axis of the sleeve 1, and at its bottom, downwardly directed surface the disc 4 is provided with a pair of circular lips 4' and 4" each of which has an inner frustoconical surface directed toward the axis of the sleeve 1 and an outer cylindrical surface defining a sharp edge with the frustoconical surface. The circular lips 4' and 4" extend coaxially around the sleeve 1 and are concentric with respect to each other. In any vertical plane which contains the axis of the sleeve 1 and which passes through the circular lips 4' and 4", the inner frustoconical surfaces thereof extend at an acute angle with respect to a vertical line.

The hollow machine body or housing 46 has beneath its top wall a horizontal partition wall 46' to the underside of which is fixed a bracket which carries a second motor 13. This motor 13 serves to drive, through a pulley 14, a belt 17' which drives a second pulley 17. This second pulley 17 is coaxially fixed to a rotary shaft 7 which is supported for rotary movement by a pair of bearings 6 which are in turn carried by an elongated cylindrical sleeve 5 having opposed open ends through which the shaft 7 extends. This cylindrical sleeve 5 is fixedly carried by the partition 46' and extends through a central opening thereof. In this way the motor 13 serves to drive the shaft 7 whose top end extends higher than the sleeve 5.

The top end of the drive shaft 7 is centrally fixed to a second rotary disc 9 which is situated beneath the disc 4 in a horizontal plane parallel to the disc 4. Thus, the disc 9 is coaxial with the disc 4. This disc 9 has at its upper surface a pair of upwardly directed circular lips 9' and 9" which are concentric and which extend coaxially about the axis of the drive shaft 7. These lips 9' and 9" also have inner frustoconical surfaces which in a vertical plane form an acute angle with a vertical line, and these lips have outer cylindrical surfaces coaxial with the shaft 7, so that the lips 9' and 9" also have sharp edges. It is to be noted that the downwardly directed sharp edges of the lips 4' and 4" are located adjacent and surround the upwardly directed sharp edges of the lips 9' and 9" while extending to an elevation somewhat lower than the upper sharp edges of the lips 9' and 9".

At its outer periphery the disc 9 has a portion 9''' of frustoconical configuration, so that the disc 9 has a hollow upwardly directed interior, and the disc 9 terminates in an outer peripheral edge 15 defining the uppermost edge of the frustoconical portion 9''' and also defining a circle across which the flowable material is moved in a manner described below.

The top end of the shaft 7 fixedly carries a projection 7', which may be of conical or pyramidal configuration, and this projection 7' rotates together with the shaft 7 and the disc 9 fixed thereto and extends into the bottom open end of the sleeve 1. This upwardly directed tapered projection 7' forms a central location to which the flowable material is directed from the supply means.

It is apparent that during rotary movement of the discs 4 and 9 a body of flowable material situated at this central location will be centrifugally spread out in a layer which must flow over and under the sharp edges of the lips 9',4',9", and 4", respectively, before reaching the outer periphery 15 of the disc 9 to flow centrifugally beyond the circle defined by this outer periphery 15. In this way the disc 9, together with the disc 4 in the embodiment of FIG. 1, forms a centrifugal-spreading means for spreading the flowable material from the body thereof located at the central location where the projection 7' is situated outwardly in the form of a layer of material which circumferentially surrounds the central location and which centrifugally advances toward and across the circle defined by the periphery 15 of the disc 9. With this construction the flowable material will be equally distributed over the disc 9 and any tendency for agglomerations to form will be inhibited by the action of the circular lips on the material as it advances toward and moves across the circle defined by the periphery 15. If there are any agglomerations these will be broken up by the action of the circular lips, and in addition the particles of a solid flowable material will be very uniformly distributed with respect to each other with this construction so that an exceedingly uniform layer of flowable material will be advanced across the circle defined by the periphery 15 with this construction. The material which is deposited on the projection 7' will flow outwardly toward the lip 9' because of the tapered configuration of the projection 7' and the movement of the material will not stop at the projection 7' but instead the material will continuously advance while being centrifugally spread out in the form of a layer which advances toward and across the periphery 15.

Situated in the interior of the housing 46 is a second partition 22 which is located over the disc 4 and which is also horizontal, this partition 22 being formed with the central opening through which the rotary cylinder 3 extends with considerable clearance. The outer portion of the partition 22 forms the common top wall of a plurality of compartment means 33 which are distributed about the circle defined by the periphery 15 of the disc 9 and which have openings communicating with this circle to receive the flowable material which moves across the latter circle, and the arrangement of the plurality of compartment means 33 is such that they receive equal quantities of the flowable material, respectively. As is indicated in FIG. 2, the several compartment means 33 are uniformly distributed circumferentially about the circle 16 which is defined by the peripheral edge 15 of the disc 9. The several compartment means 33 are separated from each other by vertical walls 18 one of which is situated between each pair of adjoining compartment means 33, and each vertical wall 18 has an inner edge which is situated closely adjacent to the circle 16. Moreover, the several walls 18 which separate the several compartments from each other extend tangentially with respect to the circle 16, while the disc 9 rotates in the direction which throws the material across the circle 16 substantially in the directions in which the walls 18 extend as shown in FIG. 2. Thus, the inner edges of the walls 18, which are suitably beveled at their inner edges, define between themselves the inlet openings through which the flowable material enters in equal quantities respectively into the several compartments 33, and these inner edges of the walls 18 extend vertically in a downward direction from the partition 22.

The several compartment means 33 have a common outer cylindrical wall 32 fixed to the inner surface of the housing 46, and the outer vertical edges of the walls 18 are respectively fixed to the inner surface of the cylindrical wall 32. In addition the several compartment means 33 have a common inner wall 19 of frustoconical configuration which extends upwardly beyond the lower ends of the inner vertical edges of the walls 18, and the top edge of the wall 19 is situated inwardly of the outer periphery of the disc 9, so that the circle 16 has a diameter greater than the smallest diameter of the wall 19. This wall 19 is fixed to those inner edges of the walls 18 which are situated below their vertical inner edges, and the wall 19 defines an inner vertical wall for the several compartments 33.

Thus, the several compartment means 33 have an equiangular circumferential distribution about and adjacent to the circle 16 for receiving equal quantities of the layer of flowable material which is centrifugally moved across the circle 16. The several compartments 33 respectively terminate at their lower ends in bottom outlet ends 23 in the form of separate tubes which respectively communicate with the several compartments 33 in the manner shown most clearly in FIG. 1. Thus, the flowable material received by the several compartment means 33 will not remain therein but will continuously flow downwardly therethrough and out through their tubular bottom outlet ends 23, respectively, these tubular bottom outlet ends 23 being permanently open as indicated in FIG. 1. It is to be noted that the discs 4 and 9 are rotated at a relatively high speed so that the material is advanced at a relatively high speed, and because of the tangential arrangement of the walls 18 the speed of movement of the material is not disturbed and the material flows continuously from the periphery 15 of the disc 9 into the several compartments 33 without experiencing in any way any disturbance in its movement. Thus, with the apparatus of the invention there is a continuous uninterrupted flow of the material from the central location where the projection 7' is located uniformly across the circle 16 into and downwardly through the several compartment means 33 beyond the bottom outlet ends 23 of the latter, respectively.

The upper portion 20 of the sleeve 1 forms a hopper for receiving the flowable material from the weighing means of the invention with the embodiment of FIG. 1, and this weighing means includes a hopper 27 of substantially cylindrical configuration which receives the material from the supply means 26. The hopper 27 instead of being cylindrical can also be rectangular or square in horizontal section. The hopper 27 is supported by suitable knife edges at one end of a balance arm 50 of the weighing means, this balance arm 50 itself being supported by a suitable knife edge on a suitable stationary block carried by the top wall of the machine housing 46. The bottom open end of the hopper 27 is releasably closed by a hinged closure means 29 urged by a suitable spring toward its closed position. This spring may be in the form of a wire spring coiled about the hinge pin which connects the closure plate 29 to the hopper 27 at its bottom end in the manner indicated schematically in FIG. 1.

Normally the closure member 29 is in a position closing the bottom end of the hopper 27 of the weighing means so that the weighing means in the embodiment of FIG. 1 interrupts the flow of material along its path of movement from the supply means 26 to the central location where the projection 7' is situated. The weight of the material deposited on the closure member 29 is great enough to swing it open in opposition to the spring which urges it toward its closed position, but the closure member 29 is prevented from opening by a latch member 30 which is swingably connected to the hopper 27, which has the configuration of a bell crank, and which has at its bottom end a hook engaging the underside of the cover plate 29. Therefore, as long as the latch member 30 remains in the position thereof shown in FIG. 1 the material which flows continuously from the supply means 26 will continue to collect in the hopper 27 on the closure member 29 thereof.

Of course during the increase in the amount of material in the hopper 27 the balance arm 50 continuously swings in a counterclockwise direction, as viewed in FIG. 1, and the right arm of the balance arm 50, as viewed in FIG. 1, carries an electrical contact which is not illustrated and which is insulated from the arm 50, and this contact will engage a stationary contact to close an unillustrated electrical circuit when the arm 50 reaches the balance position indicating that the predetermined weight of material in the hopper 27 has been reached. In order to set this predetermined weight the arm 50 carries a slide member 51 which can be positioned on the arm 50 to provide for the weighing means a predetermined weight of material in the hopper 27.

A solenoid 31 is mounted on a suitable bracket carried by the upper hopper portion 20 of the sleeve 1, and this solenoid 31 is located in the electrical circuit which is closed when the weighing means indicates that the predetermined weight of material in the hopper 27 has been reached. The energizing of the solenoid 31 automatically upon reaching of a predetermined weight of material in the hopper 27 causes the armature of the solenoid to suddenly move upwardly and to forcefully strike against a block carried by the horizontal arm of the bell-crank latch 30, so that the latch 30 at this time is automatically kicked in a clockwise direction, as viewed in FIG. 1, displacing its lower hook end away from the cover 29 which because of the weight of material thereon will automatically swing down to release the predetermined quantity of material in a body onto the projection 7' at the central location which is surrounded by the centrifugal-spreading means described above. The release of the body of flowable material from the weighing means immediately causes the balance arm 50 to swing in a clockwise direction, as viewed in FIG. 1, so that the circuit of the solenoid becomes open and the solenoid is deenergized. The light spring which acts on the cover 29 swings the latter to its closed position and the block carried by the horizontal arm of the latch 30 maintains the latter in the closed position, so that the cover 29 snaps over the hook end of the latch 30, this hook end being suitably beveled, as shown in FIG. 1, so that the cover 29 can swing to its closed position and be latched in this closed position by the latch 30 until the next body of flowable material of predetermined weight accumulates in the hopper 27.

Of course, during the collection of material in the hopper 27 the body which has previously been deposited at the central location is centrifugally spread out and moves uniformly across the circle defined by the periphery 15 of the disc 9 into the several compartment means 33 in equal quantities, respectively, in the manner described above, and in this way the several receptacle means 56 which are respectively situated beneath the bottom outlets 23 of the several compartment means 33 will respectively receive equal quantities of flowable material the total weight of which has been predetermined in the above-described manner.

The supply means 26 includes a hopper which receives the flowable material from any suitable source, and beneath this hopper is located an endless conveyor belt which conveys the material to the right end of the supply means 26 where there is a bottom outlet situated over the hopper 27 of the weighing means, and the flowable material is continuously delivered to the weighing means during operation of the apparatus of the invention.

Thus, it is apparent that the structure of the invention provides for the flowable material a path of movement extending from the supply means 26 to the central location where the projection 7' is situated, and from the latter circumferentially across the circle 16 into the several compartment means 33 where the path of movement of the flowable material includes several subsidiary paths of movement respectively extending downwardly through the several compartment means 33 into the several receptacle means 56. In the embodiment of FIG. 1 the weighing means is situated at that part of the path of movement which is located between the supply means 26 and the central location where the projection 7' is situated.

The several receptacle means 56 have their bottom open ends respectively closed by swingable closure plates 57 which are urged by suitable unillustrated springs to the closed position shown for the left closure plate 57 in FIG. 1, these springs, for example, being coiled about the hinge pins which support the closure plates 57 for swinging movement. The several receptacle means 56 are respectively carried by arms 59 which project radially from a hub fixed to a central shaft 58 which is intermittently rotated. This shaft 58 is rotated from any suitable unillustrated drive in a stepwise manner, for a purpose described below, during those intervals when the plate 29 is in its closed position and the next body of flowable material is accumulating in the hopper 27 of the weighing means, and the shaft 58 is set into rotation only after the body of material which has been deposited at the central location has been distributed into the several compartment means 33 and received in the several receptacle means 56. Only a relatively short time is required from the moment of release of a body of flowable material from the weighing means to the central location until equal quantities thereof are received in the several receptacle means 56, and the stepwise movement of the latter has already terminated and these receptacle means are again respectively situated beneath the several compartment means 33 in position to receive the next quantities of material therefrom before the next body of material is released from the weighing means.

The stepwise rotation of the arms 59 takes place in the direction of the arrow 34 shown in FIG. 2, and the several receptacle means 56 will move in this way through the locations a,b,c,d indicated in FIG. 2. It is to be understood that there is a receptacle means 56 beneath each compartment means 33, so that there are as many receptacle means as there are compartment means, and only four receptacle means at the locations a—d are indicated in phantom lines in FIG. 2 for the sake of convenience. As is schematically indicated in FIG. 2 a gear which is coaxially fixed to the shaft 58 for rotary movement therewith meshes with a gear of equal diameter and an equal number of teeth, and this second gear is coaxially connected to a rotary plate 64 which is fragmentarily indicated in FIG. 6. This rotary plate 64 carries a plurality of cradles 67 which are uniformly distributed about the axis of rotation of the plate 64 and which are equal in number to the number of receptacle means 56, and the radial distance of the several cradles 67 from their turning axis is chosen so that each cradle 67 will become situated beneath a chute 60 which is situated at the location A shown in FIG. 2. This chute 60 is thus located beneath each receptacle means 56 as it arrives at the position A, and upon arrival at this position a suitable electromagnet is energized to pull the closure member 57 to an open position releasing the material in the receptacle means 56 which is located at the position A into the chute 60.

Figure 6:
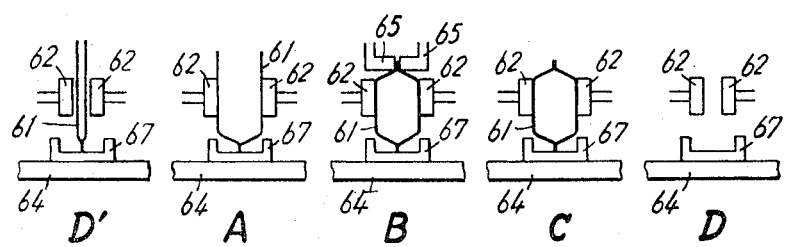
FIG. 6 is a schematic illustration of various steps involved in the packing of the quantities of material into heat sealable containers.

The several cradles 67 are respectively provided with containers 61 which in the illustrated example are in the form of bags made of a heat sealable film, and these bags are in the open position indicated at the position A in FIG. 6 so that the material from the chute 60 drops into the bag 61 which is also at the position A. The energizing and deenergizing of the electromagnet which opens each closure plate 57 and then releases it for return to its closed position and the stepwise rotation of the shaft 58, and thus the stepwise rotation of the plate 64, are controlled by a suitable unillustrated timer which immediately after the material has emptied from a receptacle 56 at the location A deenergizes the electromagnet so that the closure plate 57 thereof returns to its closed position and the next stepwise rotation of the shaft 58 takes place through an increment great enough to situate the next receptacle means at the location A, and of course the next open bag will thus also become situated beneath the chute 60 to receive the next quantity of material. The plate 64 will turn in a counterclockwise direction, as viewed in FIG. 2, in a direction opposite to that indicated by the arrow 34, so that the several cradles advance through the locations A,B,C,D indicated in FIG. 2, and the bags which are located at the cradles B,C,D will respectively have received material from those receptacle means which are located at the locations b,c,d indicated in FIG. 2. It is to be noted, however, that when the cradles are at the locations B,C,D of FIG. 2, they have not yet received a new bag. A new bag which is substantially flat and empty is provided on each cradle as it reaches the location D' before it has advanced to the location A, and at the location D' there are suction members 62 which upon movement through an increment beyond the location D' communicate with a source of suction which causes the suction members 62 to act on the sides of the bag and to pull them to the open position in which they are maintained while the plate 64 turns each bag through the location A. In this way each bag will be fully open by the time it reaches the location A. When each bag with the predetermined quantity of material therein has reaches the position B, it comes into the operative range of a pair of heat-sealing members 65, shown in FIG. 6, these heat-sealing members 65 acting in a known way to heat sealably close the top end of the filled bag 61. The film used to make the bags 61 may be any heat sealable synthetic resin such as polyvinyl chloride or polyethylene, and thus when the sealing members 65 come together, while being at the proper temperature, the top end of the filled bag will be heat-sealed.

In this way a closed and sealed bag will reach the position C indicated in FIG. 6, where the completely closed and filled bag 61 is removed, and during rotary movement to the location D' the suction members 62 are again displaced toward each other so as to be in the proper position for receiving the next bag. Thus, with this embodiment, while the next body of material accumulates at the weighing means the several bags 61 are filled with the previous quantities which have been respectively received in the receptacle means 56, and at the end of the filling operations of one cycle, the receptacle means 56 are again respectively positioned beneath the bottom outlet ends 23 of the several compartment means 33 to receive the next quantities from the next body of material which is about to be released from the weighing means, and then this cycle is repeated.

Thus, with the embodiment of FIGS. 1,2 and 6 the material conveyed by the belt of the supply means 26 is continuously poured into the hopper 27 of the weighing means which will automatically release a body of flowable material to the central location when this body of material reaches the predetermined weight for which the weighing means is set. This body of material is then spread out into the form of a layer in which the material is uniformly distributed, as a result of the action of the above-described means 4, 9 which continuously rotates. The discs 4 and 9 rotate at a high speed. Where the flowable material is a granular powder, the powder is centrifugally spread out toward the periphery 15 of the disc 9 while sliding on the disc 9 in a direction opposite to its direction of rotation and while continuously advancing radially away from the central location to the circle 16 defined by the periphery 15 of the disc 9. Thus, the body of material becomes uniformly distributed into a thin layer in which the particles of the material are uniformly spaced from each other and this layer of uniform thickness is thrown centrifugally, also in the direction of the arrow 34 of FIG. 2 into the several compartments 33 after moving across the circle 16. The material must initially slide over the sharp edge of the lip 9' and then under the sharp edge of the lip 4', so as to undergo an action which will not only uniformly distribute the material but which will also serve reliably to break up any agglomerations thereof. This action is repeated by the lips 9'' and 4'', so that the uniform distribution of the material is assured, and then the layer centrifugally flows uniformly beyond the edge 15 of the disc 9 into the several compartment means 33.

While the discs 4 and 9 rotate in the same direction, they rotate at different speeds, in accordance with the properties of the flowable material. For example in the case where the material has an average particle size of 70 mesh, the disc 9 is rotated at a speed of 180 r.p.m., while the disc 4 is rotated at a speed of 220 r.p.m. Because of this difference in the rotary speeds of the discs, the body of flowable material is acted upon as it engages first one and then the other disc so as to have any agglomerations broken up and uniformly dispersed, and as a result of this action the uniformity in the distribution of the particles is enhanced. Because of the different speeds of rotation of the discs 4 and 9 the flowable material experiences a shearing action as it moves between the adjoining pairs of lips, thus resulting in a uniform distribution of the particles.

Where the particles of flowable solid material form a relatively thin layer the spacing between the particles become sufficiently large to surround each particle with air so that each particle moves freely and there is no possibility of agglomerations of the particles by engagement with each other. All of the particles experience identical movements.

In the event that the property of the body of flowable material is such that agglomerations will not occur, it is possible to utilize the disc 9a of FIG. 4 having a frustoconical configuration but only one inclined surface so that in such a case the structure can be considerably simplified. The embodiment of FIG. 4 will provide a uniform distribution of the material into a layer where the property of the material is such that it flows freely and does not have any tendency to agglomerate.

Also, the rotary disc 9b of FIG. 3 can be used by itself in cases where the properties of the material is such that there is only a slight tendency, if any, for agglomerations to occur. In such a case the single disc 9b of FIG. 3 will subject the flowable material only to the influence of the upwardly directed lips 9' and 9" and of course the outer portion of frustoconical configuration, so as to guarantee that in the case of a slight tendency for agglomerations the material will nevertheless be reliably broken up and uniformly dispersed. Thus, with the embodiment of FIG. 3 the particles will move parabolically along the disc 9 while rising over the lips thereof and falling downwardly from these lips so as to be reliably dispersed even if there is a slight tendency to agglomerate, the impact resulting from the successive dropping of the particles after they move over the sharp edges of the lips being sufficient to eliminate any tendency of the particles to adhere to each other. With the embodiment of FIGS. 3 and 4 it is possible to use lesser speeds of rotation for the discs, and this is beneficial in the case where the mass of the flowable material is relatively great.

The features of FIGS. 1—4 are particularly designed for relatively small quantities of light weight. When operating with relatively large quantities of greater weight, on the order to several tenths of a kilogram or more, the weighing with a weighing means located between the supply means and the central location to which the material is delivered is not as beneficial as situating the weighing means further along the path of movement of the flowable material, and in particular it has been found to be advantageous in this case to carry out the weighing operation after the operation of dividing the flowable body of material into equal quantities. The embodiment of FIG. 5 is designed to handle materials of this nature, where the quantities are relatively large and heavy.

In this embodiment the supply means 26 may be identical with that of FIG. 1 and continuously delivers the flowable material through a guide sleeve 1a. The flowable material is thus deposited in this embodiment also at a central location where the projection 7' at the top of the shaft 7 is located, and this shaft 7 is driven in the same way as in the embodiment of FIG. 1. The shaft 7 fixedly carries the disc 35 and is surrounded by a second, hollow shaft which carries the disc 36. The discs 35 and 36 function in this case as the centrifugal spreading means for uniformly spreading the body of material into a layer which will again flow across the circle 16 into the several compartment means 33, as described above. In this case the separate smaller disc 35 provides a single sharp edge over which the material flows and beyond which the material drops onto the larger disc 36, which is coaxial with the disc 35, so as to be spread out thereon before reaching the several compartment means 33.

With this embodiment it may be desirable from time to time to interrupt the flow of material to the centrifugal spreading means 35,36 while it continues to be supplied from the supplies means 26, and for this purpose the sleeve 1a is guided for vertical movement in a suitable outer sleeve which is carried by the housing 46. Thus, the outer sleeve which guides the sleeve 1a has an upwardly directed shoulder against which the bottom end of a coil spring 42 presses, and this coil spring 42 presses at its upper end against a flange extending outwardly from the sleeve 1a and located next to the top wall of the housing 46. Just above this latter flange a stirrup or U-shaped end of a rod 44 extends along a semicircle around the sleeve 1a and is pivotally connected thereto by the pins 41. The rod 44 is pivotally supported intermediate its ends on a pivot pin carried by a bracket 45 which is mounted on the top wall of the housing 46, and the outer end of the rod 44 is formed with a slot which receives a pin connected to the armature of a solenoid 43. At some time after the weighing operation and after situation of the quantities of material in their containers, it may be desirable to interrupt the flow of material to the centrifugal-spreading means 35,36, and at this time the operator will close a switch in a circuit in which the solenoid 43 is located, to energize the latter and displace the rod 44 to the solid line position shown in FIG. 5, thus situating the bottom end of the sleeve 1a closely adjacent to the inner central portion of the disc 35 and interrupting the flow of material to the centrifugal-spreading means in this way. When the flow to the centrifugal-spreading means is to continue, the operator will deenergize the solenoid 43 by opening the circuit, so that the spring 42 will now expand to displace the sleeve 1a upwardly, thus locating the rod 44 in the dot-dash line position shown in FIG. 5, and now as a result of the greater space between the bottom end of the sleeve 1a and the centrifugal-spreading means, the body of flowable material at the central location can be spread out by the centrifugal-spreading means to be delivered therefrom to the several compartment means 33. The supply means 26 operates continuously to provide a continuous supply of material to the interior of the sleeve 1a, so that even during an interruption in the flow of the material to the centrifugal-spreading means the body which is to be spread thereby is nevertheless still accumulating.

Figure 5:
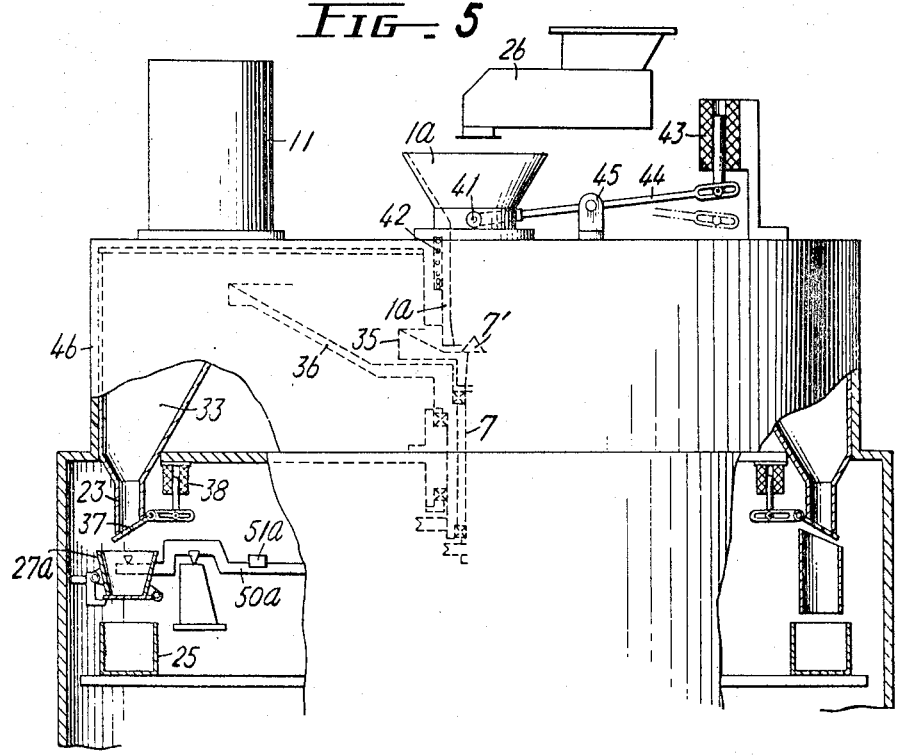
FIG. 5 is a fragmentary schematic side elevation of another embodiment of an apparatus according to the present invention.

The several compartment means 33 of FIG. 5 are identical with those of FIG. 1 and include the same tangential walls 18 which separate the several compartment means from each other. Also they have the several bottom outlet ends 23 which are indicated in FIG. 5. However, in this embodiment each compartment means 33 is provided with a closure means in the form of a hinged closure plate 37 capable of assuming the closed position shown in FIG. 5 to prevent the flow of material out of the bottom outlet end 23 of each compartment means 33. Each closure plate 37 is actuated by a solenoid 38, and thus there are as many solenoids 38 and closure plates 37 as there are compartment means 33 with the several plates 37 forming a closure means for closing the compartments 33 to temporarily interrupt the flow of material therefrom.

With the embodiment of FIG. 5 the material flowing from the several compartments 33 is received directly in the plurality of receptacle means 25 which are respectively situated beneath the bottom outlet ends 23 of the several compartment means 33. These receptacle means 25 form the final containers for the material and correspond to the bags 61, and if desired the receptacles 25 can take the form of such bags, although for the heavier larger quantities it is also possible to use cans or other containers such as suitable boxes, for example, for the receptacle means 25 of this embodiment. The several closure plates 37 are normally in an open position, so that the material delivered to the several compartment means 33 flows directly out of the latter, and this material is directly received in the containers or receptacle means 25, as indicated at the right in FIG. 5 which also shows a suitable guide sleeve situated between each compartment means and container therebeneath. Thus, with this embodiment a number of the receptacle means 25 which form the final containers for the material will be directly filled from the several compartment means 33, and this filling takes place simultaneously for the several containers 25.

However, between one or more of the bottom outlet ends 23 of one or more compartment means 33, respectively, and the containers 25 therebeneath, respectively, are situated weighing means having a structure identical with that described above in connection with FIG. 1. Thus, assuming that only one weighing means is provided beneath the one compartment means 33, it will have a construction as shown at the left of FIG. 5, and in this case only the flow of the material to the container 25 shown at the left of FIG. 5 will be interrupted by the weighing means. In this case also the weighing means has a hopper 27a which receives the material and which has a swingable closure wall at its bottom end acted upon by a latch which is capable of being displaced to an open position by the action of a solenoid when the predetermined weight is reached. Thus, when the weighing means shown in FIG. 5 receives a predetermined weight of material it will automatically release this weight of material to the left container 25 shown in FIG. 5. The circuit which energizes the electromagnet which opens the latch of the weighing means of FIG. 5 also simultaneously energizes all of the solenoids 38 which immediately act to displace the several plates 37 to their closed positions, so that at the moment when the weighing means receives the predetermined weight the flow of material to the several containers is interrupted, and thus all of the several containers will with this embodiment simultaneously receive a predetermined weight of material, and it is only that container 25 which coacts with a weighing means as shown at the left of FIG. 5 which receives the material in a body, while the remaining containers continuously receive the material.

As was indicated above the discs 35 and 36 are separately driven. For this purpose, as is indicated schematically in FIG. 5, the shaft 7 of this embodiment takes the form of an inner shaft which has its own driving pulley driven from an independent source of power, and this inner shaft carries the projection 7' and the inner disc 35. The inner shaft is surrounded by a tubular hollow shaft carrying bearings for the inner shaft and provided with its own pulley, and this outer shaft is supported on suitable bearings for rotary movement and fixedly carries the disc 36. The pulley fixed to the outer hollow shaft has its own separate drive. Thus, with this embodiment it is possible to rotate the discs 35 and 36 at different speeds, with the disc 35 rotating at a higher speed than the disc 36, so that it becomes possible in this way to effectively avoid any tendency for the body at the central location where the projection 7' is located to stagnate. The body which is deposited at the central location will thus be effectively spread out by the centrifugal-spreading means.

Thus, with the apparatus of the invention uniform distribution of the flowable material is assured, and the several quantities which are separately packed into separate containers, respectively, will have uniform particle distribution and size. However, it is also possible with the apparatus of the invention to locate in single containers quantities of different materials of different properties, and these several quantities in one container will also be uniform in the several containers. In addition, the apparatus of the invention is capable of handling materials of widely different properties.

Thus, it is possible with the apparatus of the invention to pack flowable materials made up of particles which are different from each other, such particles having for one group of particles a size such as 15 mm. × 5 mm. × 3 mm., for another group of particles the size of 15 × 4 × 0.3 mm., and a third group 4 × 3 mm. Even with particles of such different sizes in the body of flowable material it is possible to achieve a uniform dispersion and uniform packing. During the spreading action derived from the centrifugal-spreading means of the invention, the spacing between the particles becomes greater and the particles, even if they are of different sizes, will be uniformly distributed throughout the layer which is divided into equal quantities upon reaching the several compartment means 33. Thus, the quantitative packing operations are effectively performed independently of the size and properties of the individual particles and independently of the extent to which the particles deviate from a given size.

As was mentioned above, it is also possible with the invention to pack liquid materials, particularly if they are of a relatively viscous nature, such as in the form of oils or fats. The effect of the centrifugal-spreading means on such a liquid material is the same as that which takes place on a granular powder. In addition, the uniform distribution will also take place even in the case where the liquid materials have solid particles therein. Therefore it is possible with the invention to operate either on liquid materials alone, on solid particulate material alone, even where the particles of the latter are of widely different sizes, and also on combinations of liquids and solids of any grain size or combination of sizes.

In an actual apparatus having the construction shown in FIGS. 1 and 2, the discs 4 and 9 each had a diameter of 300 mm. The body of flowable material was made up of crystals of substantial spherical or cubical configuration and having an average size of about 70 mesh. This material was weighed and subdivided according to the method and apparatus of the invention so as to be packed in equal quantities in the several containers. In this particular example there were 10 compartment means 33 so that the material centrifugally and circumferentially flowing across the circle 16 was divided into 10 equal quantities. The discs 4 and 9 were rotated at 200 r.p.m. The weighing means was set to provide for opening of the hopper 27 when the weight of the body of flowable material therein reached 360 g.

After carrying out 100 complete cycles of operation as described above in connection with FIGS. 1 and 2, it was found that the maximum deviation in the weight between the packages of material was 0.25 g, and the average deviation among the several quantities in the several packages was 0.08 g.

A second test was carried out with the same apparatus utilizing at this time an adjustment for the weighing means which provided a body of material whose weight was 750 g before being deposited at the central location upon release from the weighing means. Thus, in this case the equal division of the flowable material into the 10 compartment means 33 resulted in filling of the several packages with 75 g. of the material. The cycles were repeated 100 times and upon checking it was found that the maximum deviation from one package to the next was 0.5 g. while the average deviation was 0.02 g.

Using the same apparatus but adjusting the weighing means to provide for each body deposited at the central location a weight of 1500 g, each package was filled with 150 g. of the material. Upon checking the accuracy of the operations it was found that in this case the maximum deviation from one package to the next was 0.5 g. while the average deviation was 0.15 g.

A test made on conventional weighing machines used in connection with packing of flowable materials indicate that the best accuracy that can be achieved with conventional operations is on the order of 1/200 of a fixed quantity, whereas with the method and apparatus of the invention the mean deviation is far less and is on the order of 1/300 of a fixed quantity. Thus, the apparatus of the invention is suitable for use in those industries which require a very high accuracy in the packing of given quantities of flowable materials into containers, and in addition the rapidity with which the operations are carried out with the apparatus of the invention is far greater than that which can be achieved by any known method and apparatus.

The apparatus of the invention was also used for the quantitative packing of a flowable material having components of widely different properties, such as dried liver, table salt, rice particles, etc. In an experiment carried out with a flowable material composed of all of these components, it was possible in providing packages which contained 10 g. of the material to provide a mean deviation of 1/200 of a fixed value, or better.

Of course, this latter experiment was carried out with all of the particles of different properties mixed together. In the case where each of the components of the mixture was separately packed and delivered one after the other into the several containers, the accuracy of the operation was far greater.

I claim:

1. In an apparatus for packing flowable materials, supply means for supplying a body of flowable material to a predetermined central location, centrifugal-spreading means situated at said location and extending circumferentially therefrom for centrifugally spreading the body from said central location outwardly away from the latter in the form of a layer and for centrifugally moving the layer across a circle coaxially surrounding said central location, a plurality of compartment means circumferentially distributed about and located adjacent said circle and respectively having open ends communicating with said circle and respectively receiving in their interiors equal quantities of the material moved across said circle by said centrifugal-spreading means, said plurality of compartment means respectively having bottom outlet ends through which the quantities respectively discharge from said plurality of compartment means, a plurality of receptacle means respectively situated beneath said bottom outlet ends of said plurality of compartment means for receiving the quantities of material therefrom, all of said means defining for the material a path of movement starting at said supply means, continuing therefrom to said central location, proceeding from said central location to said circle, and said path of movement including a plurality of subsidiary paths extending from said circle respectively downwardly through said plurality of compartment means to said plurality of receptacle means, and weighing means for determining the magnitude of said quantities, said weighing means being situated at said path of movement for receiving at least part of the material moving therealong and for temporarily interrupting the path of movement of the material received by said weighing means beyond said weighing means until the latter receives a predetermined weight of said material, said centrifugal-spreading means including at least one rotary disc having an outer periphery defining said circle and having a frustoconical configuration in the region of said outer periphery, said disc having an upwardly directed hollow interior the outer limit of which is formed by said outer periphery and said frustoconical configuration of said disc, said disc having an upper surface situated inwardly of said outer periphery thereof and provided with a circular upwardly directed lip coaxial with said outer periphery and having an inner upwardly directed frustoconical surface and an outer surface defining a sharp edge with said inner surface, so that the material must flow over said sharp edge before reaching said circle.

2. The combination of claim 1 and wherein said centrifugal-spreading means includes a second rotary disc situated over and located adjacent to said first-mentioned rotary disc and being substantially parallel thereto, said second rotary disc having a downwardly directed surface provided with a downwardly directed lip of substantially the same configuration as said upwardly directed lip located adjacent to and surrounding the latter, so that the material must flow between said lips before reaching said circle, the sharp edge of said downwardly directed lip of said second disc being situated at an elevation lower than the sharp edge of said upwardly directed lip of said first-mentioned disc.